April 25, 1939.  E. B. HUDSON  2,155,860
AUTOMATIC CONTROLLING DEVICE FOR TANDEM MILLS
Filed April 4, 1932  7 Sheets-Sheet 2
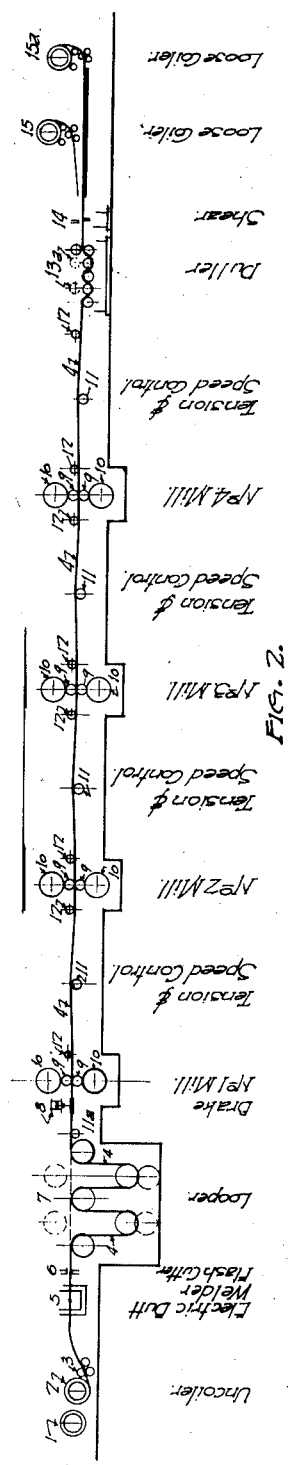
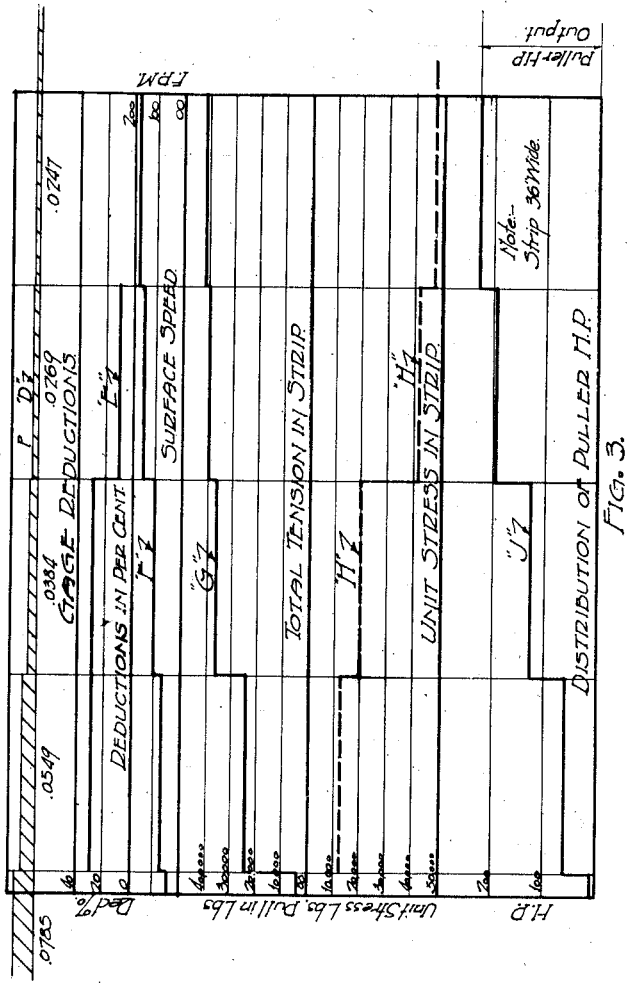
INVENTOR
Edwin B. Hudson
BY Allen & Allen
ATTORNEYS

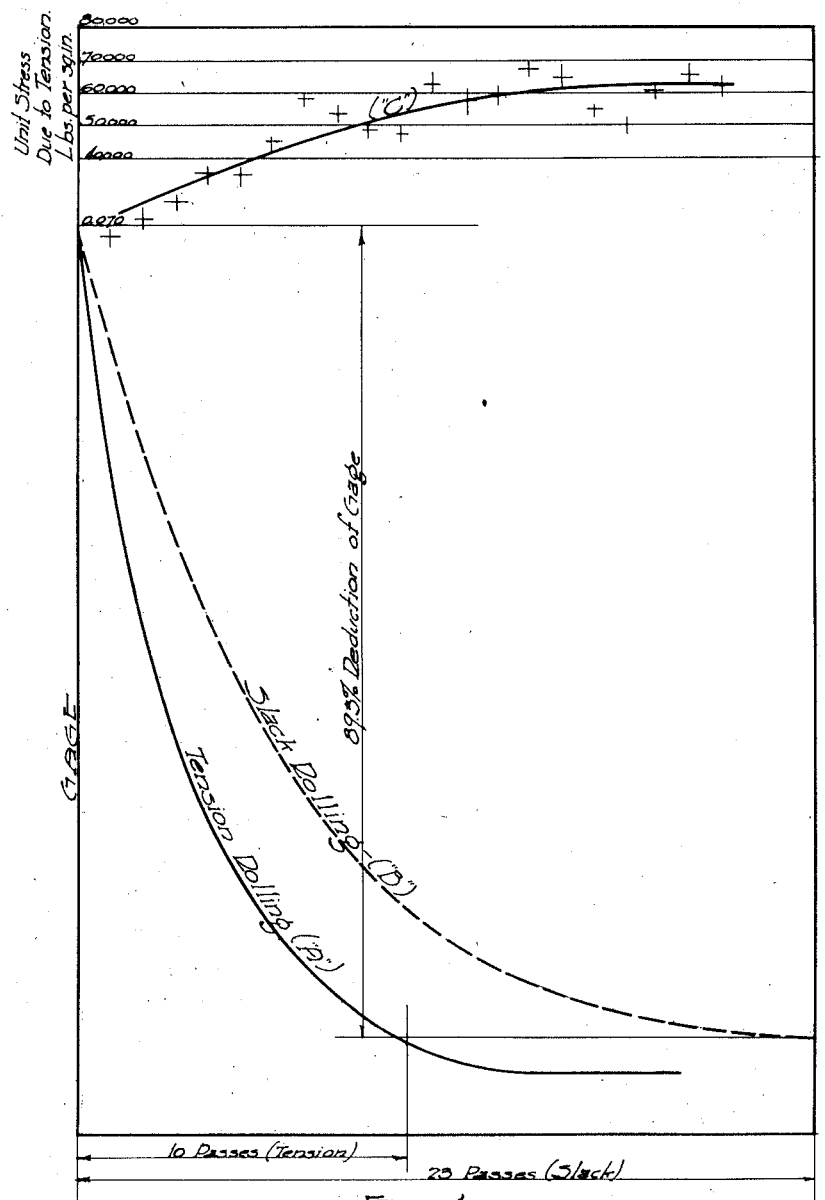

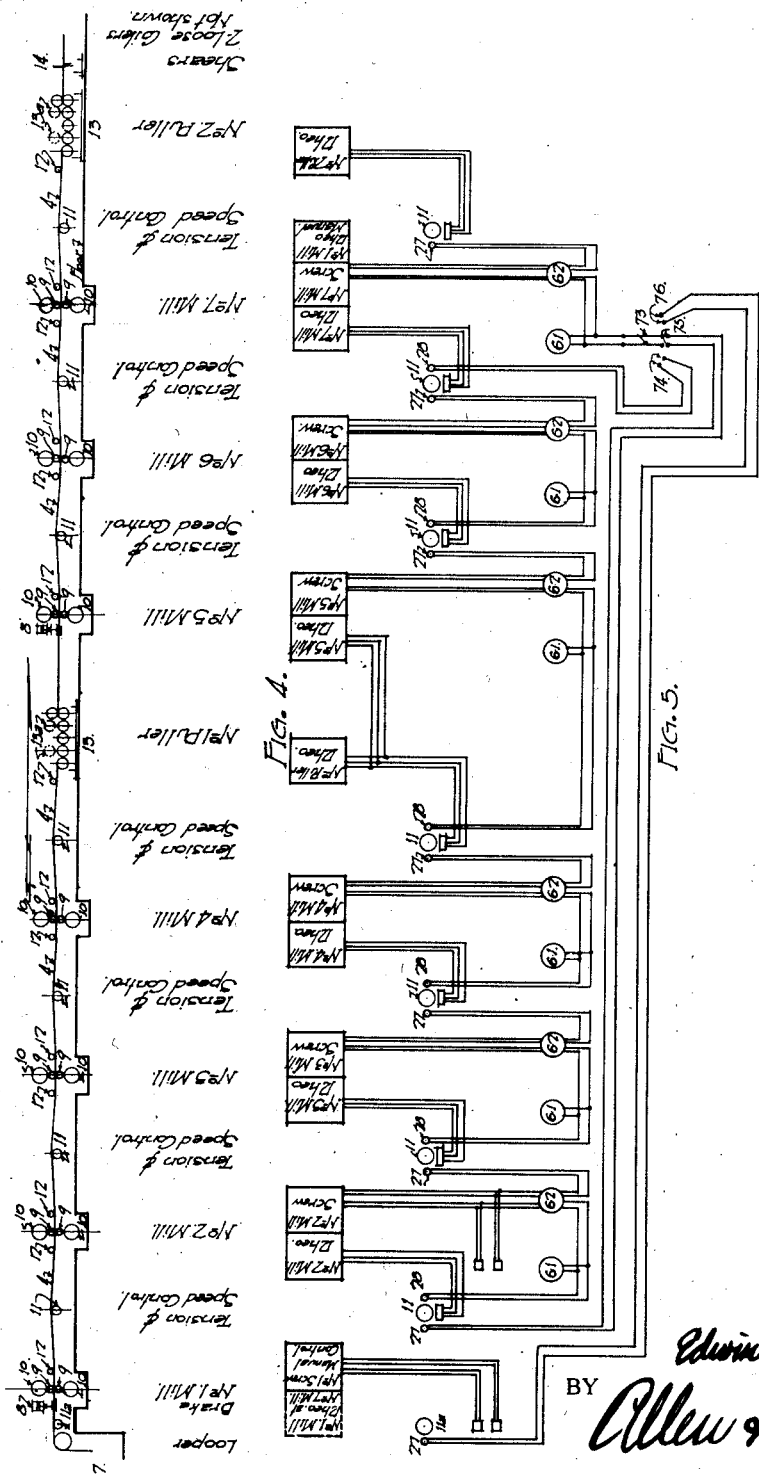

April 25, 1939.   E. B. HUDSON   2,155,860
AUTOMATIC CONTROLLING DEVICE FOR TANDEM MILLS
Filed April 4, 1932   7 Sheets-Sheet 4

INVENTOR
Edwin B. Hudson
BY Allen & Allen
ATTORNEYS

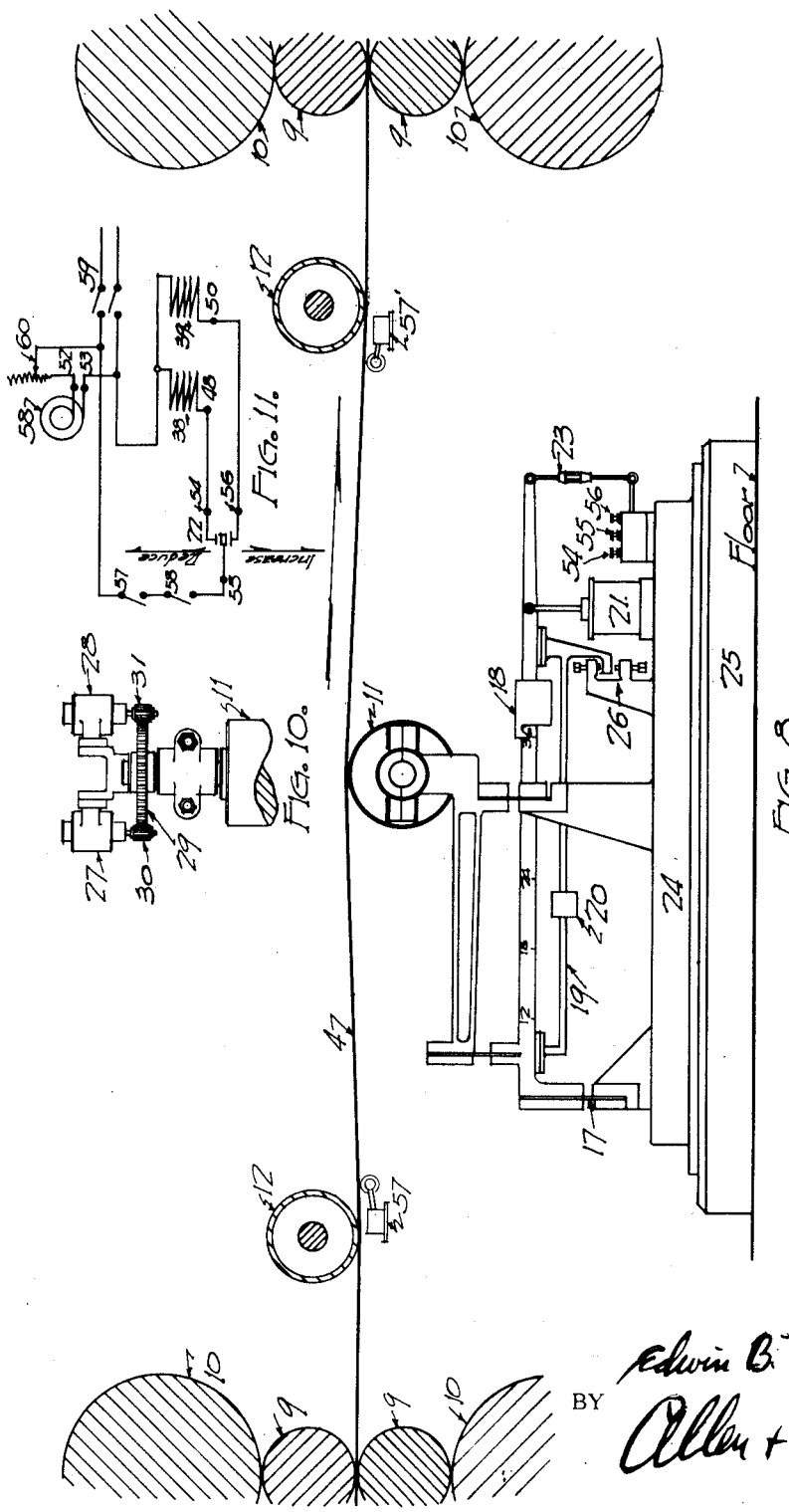

April 25, 1939.  E. B. HUDSON  2,155,860
AUTOMATIC CONTROLLING DEVICE FOR TANDEM MILLS
Filed April 4, 1932  7 Sheets-Sheet 6
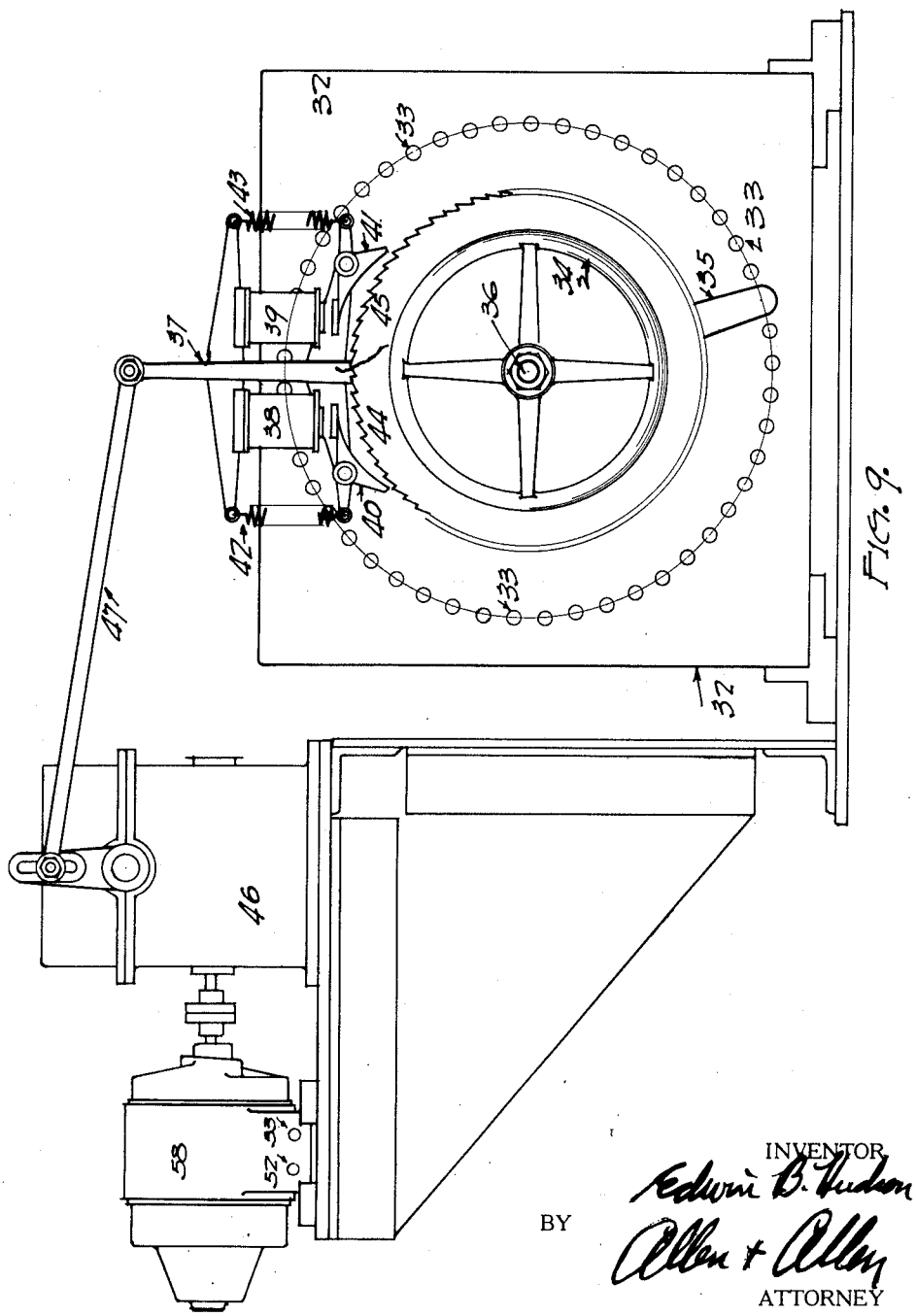

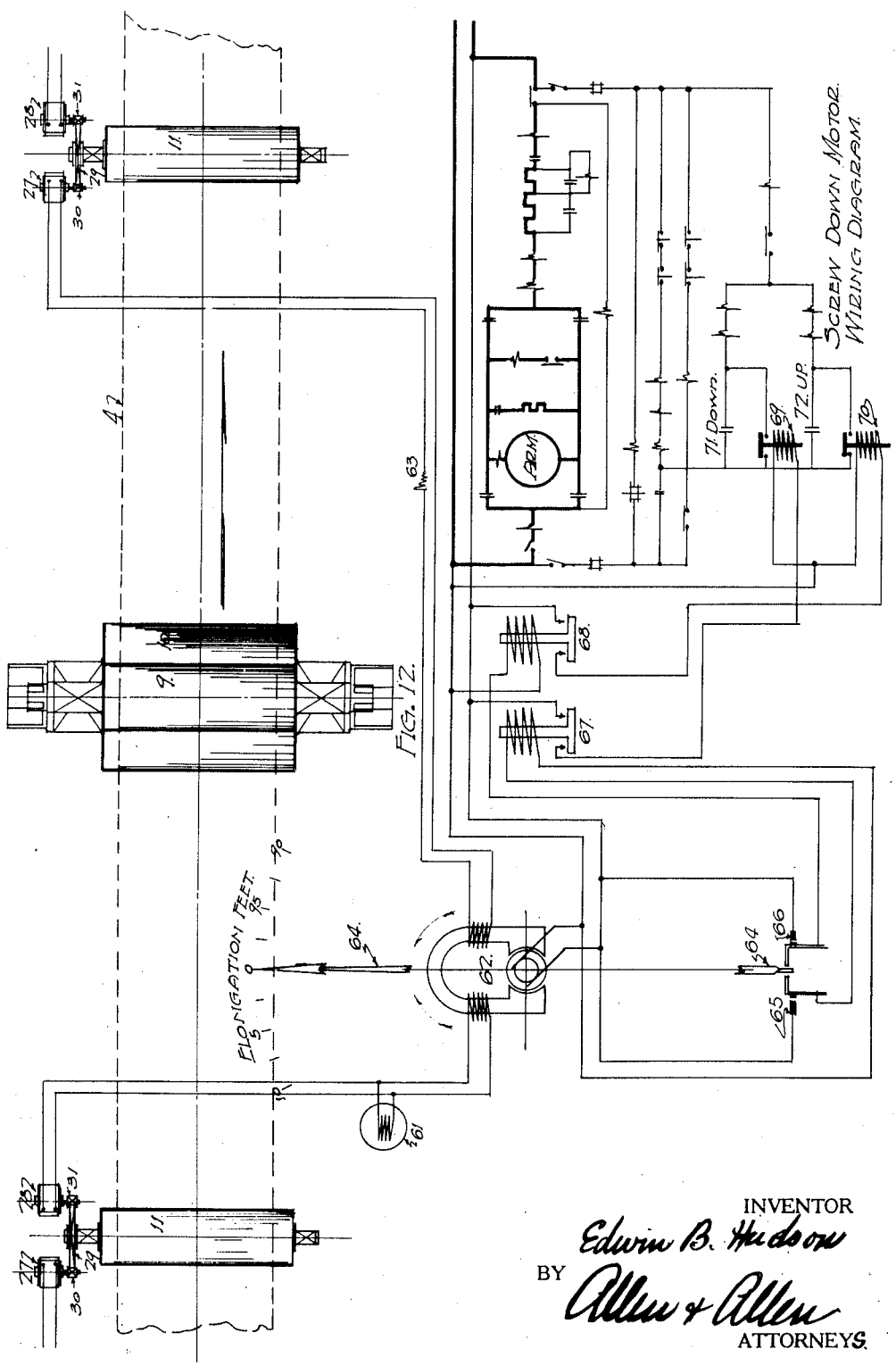

UNITED STATES PATENT OFFICE 2,155,860

AUTOMATIC CONTROLLING DEVICE FOR TANDEM MILLS

Edwin B. Hudson, Middletown, Ohio, assignor to The American Rolling Mill Company, Middletown, Ohio, a corporation of Ohio Application April 4, 1932, Serial No. 602,883

11 Claims. (Cl. 80—35)

My invention has for one of its objects the provision of means for automatically controlling and distributing strip tension in specified amounts between the various units of a tandem cold mill, said tension being produced from an outside source other than the mills, and the distribution of tension in such quantities as best suited to aid and facilitate the rolling operation. Another object of my invention is the provision of means for automatically controlling the surface speeds of the various mills of a cold mill tandem train so that all the remaining mills of a cold mill train will automatically run in step with one manually controlled mill, each mill having automatic speed control operating at the proper speed to conform with the elongation of the strip by that particular mill. My objects also contemplate means by which the mill screws will be automatically controlled to produce the desired elongation for each mill, also means for indicating the strip elongation throughout the cold mill train. The objects of my invention include methods of and means for applying power to the various cold mill stands of a cold mill tandem train, said power being supplied by a pulling machine and being distributed to the various mills in specified amounts. The power supplied by the pulling machine is delivered to the various mills in the form of tension, transmitted through the strip itself, thus aiding in reducing the strip gauge, eliminating strip camber, and in general improving the quality of the product.

By way of explanation, the art of reducing metal strips to gauge by cold rolling may be divided into two general classifications, based on the method of applying power to the mill.

Tandem cold mill

The tandem cold mill train consists of two or more stands of cold mills with driven rolls arranged in tandem, each making successive gauge reductions, so that the strip may be reduced to the desired gauge by one pass through the mills. These mills are driven by variable speed motors manually controlled, the power input being made directly into the mill rolls. Due to the strip elongation and to give a certain tension to the strip between mills, each succeeding mill runs at a higher surface speed than the mill preceding. To prevent looping between the various mills, and to provide a certain amount of tension, specially wound mill motors have had to be used to give this condition; but this method presents serious problems. It is highly desirable to have tension in the strip between the mills since tension greatly reduces camber and insures a flatter strip. But tension does not aid the mills in the rolling operation, when it is produced primarily by a higher surface speed of the succeeding mill over that of the preceding mill. If a strip is pulled in the direction of rolling, the operation may be likened to drawing the strip through a rotary die. But in tandem trains, this desirable condition is reversed on the succeeding mill, the pull being opposite to the direction of rolling, and all benefits of the preceding mill are cancelled. Again when tension exists between two mills as described, the preceding mill uses power from the succeeding mill which greatly reduces the rolling capacity of the second mill. Hence it is undesirable to cause the mills alone to produce the tension.

In my invention it will be clearly shown that power or tension can be supplied to the strip from a source other than the mills of a tandem cold mill train, and supplied in predetermined quantities, whereby each mill is aided in its rolling operation, without detriment to any particular mill. Since the power or tension is supplied from a source other than the mills, the mills themselves are reversed for the work for which they were intended.

Upon observing a tandem cold mill train in operation, it is quite evident to one skilled in the art that one or more mills are not working at capacity, since it is beyond the human capability of any mill crew properly to regulate the surface speeds of three or more mills manually and at the same time. Means are provided in my invention so that it is only necessary for the mill crew to regulate one stand manually, whereupon all the remaining stands will automatically fall into step with the manually controlled mill.

Single stand tension mill

This type of cold mill is used for the reduction of strip metals to extra thin gauges, and consists generally of a single stand four high mill with all mill rolls idle. There is a power driven reel on each side of the mill, and the entire power input into the mill is made through the strip, the mill rolls being rotated by the strip. This type of mill is capable of reducing the strip to a small fraction of the original gauge. It is, however, not very well suited for the production of medium gauges in the desired quantities, since too much time is required for placing the strip coils on the reels in the necessary preparation before the rolling operation begins. My invention as applied to this type of mill, gets away from the difficulty set forth.

The following is a full description of an exemplary embodiment of my invention, which is not limiting, and is subject to change in detail without departing from the spirit thereof. The objects of my invention set forth hereinabove, or apparent to those skilled in the art upon considering this specification, I accomplish by that construction and method of which I shall now describe the aforesaid exemplary embodiment.

In the drawings:

Figure 1 illustrates the comparatively greater rate of strip gauge reduction when using tension in combination with power driven mill rolls as compared with same mill operated without tension (slack rolling). This chart also shows the unit stress in the strip through the various stages of gauge reduction.

Fig. 2 shows a layout of 4-high tandem mills for rolling medium gauges with power driven working rolls, decoiler, electric butt welder, looper, pulling machine, shears, loose coilers and control equipment embodying my invention.

Fig. 3 shows a chart illustrating the gauge reduction, tension in strip, unit stress in strip and the puller power distribution to the various mills, when my invention is employed.

Fig. 4 shows a tandem train of seven 4-high cold mills, two pulling machines and other auxiliary equipment so arranged as to roll the thinner gauges of strip, such as tin plate.

Fig. 5 shows the schematic control diagram of the various mills and pullers illustrated in Fig. 4.

Fig. 8 shows an elevation of the mill speed control equipment, based upon the desired tension existing between the mills.

Fig. 9 shows the mill motor rheostat control which is actuated by the device shown in Fig. 8.

Fig. 10 shows the mounting of the tachometer generators on the end of the tension control roll.

Fig. 11 shows the wiring diagram for devices shown in Figs. 8 and 9.

Fig. 12 shows the relative location of the tachometer generators each side of a mill stand for registration of elongation produced by that particular mill, also means of automatically controlling the mill screw motor, and the wiring diagram for the instruments indicating elongation, together with the screw down motor wiring diagram.

Figure 6:
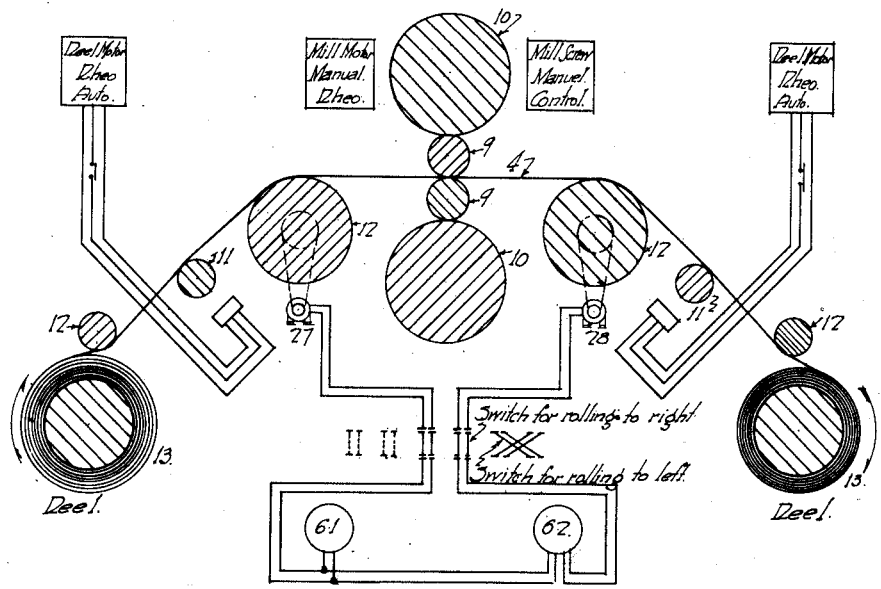
Fig. 6 shows the application of this invention to a single stand 4-high mill with power driven work rolls and two power driven tight coilers or reels.

In its generic aspect, one phase of my invention contemplates the measurement of tension between the stands of rolls and the control of the speed of the motor driving a succeeding stand of rolls in accordance with the said measurement of tension. To this end I provide a roll over which the strip passes between the mill, which roll bends the strip out of a normal straight line course, and is provided with means for measuring the power required to do so. The device may be set for a normal tension, and switch mechanisms, or the like, coupled with a suitable controller actuating device, are arranged to regulate the speed of the driving motor of the succeeding stand of rolls. It will be clear that in this way I can effect such a control of the mills in a tandem train that a fundamental speed change manually brought about upon one mill will be compensated for automatically by appropriate speed changes of the other mills, so that rolling at the new speed is accomplished with proper tension.

Additionally I provide a controlling device which is actuated by a differential measurement of the speed of the metal between different stands of rolls. It will be understood that the speed of the metal is a definite indication of the reduction per pass, and that the reduction per pass in one mill should bear a different relationship to the reduction per pass in all of the other mills, irrespective of the speed at which the mills are being driven. By the controlling means aforesaid, therefore, I not only secure proper speed ratios between mills, but make sure that each mill is doing its part of the combined duty. The controlling device described in this paragraph is of course applied to the screw downs of the various mills, which are motorized for the purpose.

The results of an experimental test of cold rolled strip on a 4-high power driven mill with and without tension is clearly shown in Fig. 1, where the various curves are given legends. The reduction of 89.3% of the strip gauge by tension rolling in ten passes as compared to twenty-three passes by slack rolling shows the economies that can be realized by the tension method. Furthermore, thinner gauges can be produced by the tension method than is possible by the slack method. Curve "A" shows the rate of reduction by the tension method while curve "B" shows the slack method. Curve "C" shows the unit stress in the strip in the various stages of the rolling operation. Stresses of 68,000 lbs. per square inch were reached without breaking the strip.

The general arrangement of mills and auxiliary equipment for a four mill layout is shown in Fig. 2. It presupposes that the strip be rolled in an endless length through the mills, by decoiling, electric butt welding, trimming the flash from the weld and looping the strip so the welding and flash cutting operation can be accomplished without slowing up or stopping the mill. The method of welding for continuous rolling is illustrated in a co-pending patent application of Hughes and Hudson, No. 526,866, filed April 1, 1931. The coils to be rolled are shown at 1 and 2. While the coil 2 is being decoiled in the decoiler 3, the strip 2 is electrically butt welded to the strip 4, which is on the mill. This is accomplished by an electric butt welder 5; and the flash is cut off in the flash cutter 6. The looper 7 provides slack so that the welding operation can be carried on without stopping the mills.

Immediately ahead of No. 1 mill is a braking arrangement 8, which prevents the fluttering of the strip when entering this mill. The mill working rolls are shown at 9 and the backing up rolls at 10. The tension rolls (see Figs. 8 and 10) are shown at 11, while the roll 11a, ahead of No. 1 mill is equipped with a tachometer generator for registering the speed of the strip only. The hold down rolls 12 definitely establish the angle with which the strip passes over the rolls 11. The pulling machine 13 is driven by a variable speed motor of more or less the same power as the mill motors. The rolls 13a are adjustable as shown, and all the pulling rolls are provided with cork inserts to make a good surface contact with the strip. The cut-off shear is shown at 14 and the two loose coilers at 15 and 15a. The strip 4, after being cut to suitable lengths, is coiled alternately in the coilers as will be understood.

Figure 4 illustrates a seven mill layout using two pulling machines, one after No. 4 mill and the other after No. 7 mill. This mill is particularly adapted for rolling tin plate gauges in strip form. Like parts are given like indicia.

The mill speed control device is shown in Figs. 8, 9, 10 and 11 and consists of a pressure roller 11, suitably mounted on a weighing device, which is a plate fulcrum scale suitably connected so that vertical pressures exerted on the pressure roller 11 will cause the beam 16 (Fig. 8) to swing in a vertical plane around the plate fulcrum 17. This may be accomplished by mounting the roller 11 in a bell crank, connected by plate fulcrums both to a fixed support and to the beam 16 as shown. The beam 16 is graduated in inches to strip widths. The scale beam weight 18 is adjustable along the scale beam 16 for the various widths of the strips. The beam weight 18 is variable as to weight, in accordance with the mill upon which the particular device is used. It is heavier between the first mills and lighter for each succeeding set of mills. The tare beam 19 and the weight 20 are used for adjustment. The scale beam 16 is provided with a dash pot 21, to prevent hunting. A two way quick acting switch 22 is connected by the adjustable rod 23 to the scale beam 16. The whole device is mounted on a base casting 24, which is supported by a concrete foundation 25. The vertical movement of the beam 16 is limited by the adjusting screws 26.

Mounted at the far end of the pressure roller 11 are tachometer generators 27 and 28, (Fig. 10) driven through gear 29 and pinions 30 and 31. The idler rollers 12 are mounted on the face of the mill housings, and definitely maintain the angle at which the strip passes over the pressure roll 11.

The mill motor rheostat and the rheostat control is shown in Fig. 9. The mill motor rheostat is of the standard type, and is shown at 32 with the contact buttons 33 and the handwheel 34. A contactor arm is shown at 35 which rotates around and with the handwheel shaft 36, and a ratchet with opposed sets of teeth 44 and 45 is fastened to the contactor arm 35 and the handwheel 34.

Reciprocally and rotatably mounted on the shaft 36 is the arm 37 which carries the solenoids 38 and 39. The dogs 40 and 41 are held in open position by the springs 42 and 43. The dog 40 engages the ratchet 44 to produce a counter-clockwise movement of the shaft 36 and the contact arm 35, thereby decreasing the mill motor speed. The dog 41 engages the ratchet 45 to produce an increase of the mill motor speed. The arm 37 is reciprocated by the worm gearing in the gear box 46, through the adjustable connecting rod 47, the worm gear being driven by a direct current motor 58. The arm 37 is reciprocated constantly, but the rheostat is only adjusted or moved when either the solenoid 38 or 39 is energized. Due to the reciprocating motion of the arm 37 there exists a period of no movement equal to the period of movement; this rest period gives time for the previous adjustment to be effected, and to prevent over control. The series switches 57 and 57' in Fig. 11 are only used on installations where the strip is not butt welded to the succeeding strip, and where the device is inactive when there is no strip in each mill. The switch 59 is the main control switch and the rheostat 60 controls the speed of the motor 58.

The operation of this device is as follows: The angle of the strip passing under the roll 12 and over the roll 11 is such that the downward reaction or pressure on roll 11 is five percent of the total tension of the strip. For example, for a particular set of mills a pull of 20,000 lbs. is desired for a 36" wide strip. The weight 18 is so proportioned that when placed at the 36" graduation on the beam 16 there will be an upward reaction or pressure of the roll 11 of 1,000 lbs., or 5% of the desired tension of 20,000 lbs. All the various units are calibrated in the same manner, but for different tensional values. With this arrangement, so long as the tension remains at the right point, the controlling device is inoperative and the arm driven by the motor 58 idles. If the tension becomes either too small or too great, the switch 22 is actuated, and the controlling rheostat operates to speed up or slow down the speed of the succeeding mill. All corrections are made quickly and constantly when there is a change in tension; giving a control that would be impossible to accomplish by manual means.

The mill screw control is shown in Fig. 12 for controlling the screw down motor.

The tachometer generator 28 indicates the surface speed of the strip entering the mill on an indicating instrument 61. The power developed by the tachometer generator 28 is also connected to the field of the differential instrument 62, setting up a flux opposing that set up by the tachometer generator 27, which is also connected to the field of the instrument 62 by a winding in the opposite direction, as shown in Fig. 12. The permanently adjusted resistance 63 is put in the circuit from the tachometer generator 27 for purpose of calibration. The gain in surface speed on the delivery side of the mill will be indicated by the hand 64 in the instrument 62. Contacts 65 and 66 are mounted on an adjustable ring (not shown) capable of rotation about the axis of the armature shaft of instrument 62, said ring capable of being positioned and fastened in any position so that the opposite end of the pointer 64 reads the desired elongation in feet. The tail end of the hand 64 will be midway between the contacts 66 and 65 with both the switches open, as long as the desired elongation or increase in speed is maintained, and the contacts 64 and 65 will remain open. Should the elongation be reduced, the contact 65 will close, energizing the resistance relay 67, and closing the relay 69 carrying the current around the hand push button 71, thus running the mill screw motor down. Similarly should the elongation increase, contact through switch 66, energizing the relays 68 and 70 around the hand push button 72, will run the mill screw motor up. The mill screw motor diagram in Fig. 12 is a common wiring diagram of the push button type, and will not be described in detail since it is not claimed in, or is a part of this invention. Figure 12 illustrates the relation of the screw motor diagram to the circuits controlled by contacts 65 and 66 which close the circuits around the hand push buttons 70 and 71 for automatic operation by the instrument 62. These circuits are actuated through relays 67 and 68 in order to reduce the voltage across the contacts 65 and 66 which are actuated by the pointer 64 of the instrument 62. Elongation can be converted into percent reduction. For example, the entering surface speed at 100 F. P. M. and the delivery surface speed of 125 F. P. M. equals 20% reduction.

Fig. 5 shows a schematic layout of the control of a seven stand tandem mill equipped with two pulling machines for rolling tin mill gauges, as shown in Fig. 4. In this arrangement which is typical, the mills 2, 3, 4, 5, 6 and 7 and the pulling machines Nos. 1 and 2 are speed controlled by the device shown in Figs. 8, 9, 10 and 11, whereas the mill speed of No. 1 mill is controlled manually by the roller, who is stationed at No. 7 mill. No. 1 mill becomes the pace maker for all the following mills and pullers, as their speeds are automatically controlled by the predetermined amount of tension existing between them. Should the speed of No. 1 mill be increased, thereby reducing the tension between mills No. 1 and No. 2, No. 2 mill will speed up until the predetermined tension is again realized. Each unit in the train will adjust itself automatically, until all the units are again in equilibrium. This is because an adjustment of tension between any two mills will disturb the tension adjustment between succeeding mills. My device will bring these maladjusted tensions into equilibrium as explained.

The roller has to control only one mill and therefore his work is greatly simplified, since he controls the speed of seven mills merely by controlling a single mill.

The automatic mill screw regulation is provided on mills Nos. 2, 3, 4, 5 and 6, whereas No. 1 has a manual screw control to convert the varying hot mill gauges to a known gauge between mills No. 1 and 2. It would be impossible to control the reductions automatically unless a known and constant gauge were established at the beginning. Therefore it is proper to control the gauge from between the mills 1 and 2 to between the mills 6 and 7. No. 7 mill will have a manual screw as this mill is to take a very light flattening pass, or what is known to the art as a skin pass to finish the strip exactly to gauge, thereby eliminating the skin pass on a separate mill as is now the usual practice. The automatic screw is used in roughing down to a few points above the ultimate desired gauge.

The three way switch 73 (Fig. 5) is movable to contacts 74, 75 and 76. The switch at contact 74 shows the elongation on No. 7 mill only; while the switch at contact 75 shows the overall elongation from the entering side of No. 2 mill to the exit side of No. 7 mill, and the switch at contact 76 shows the overall elongation through all the mills.

Figure 7:
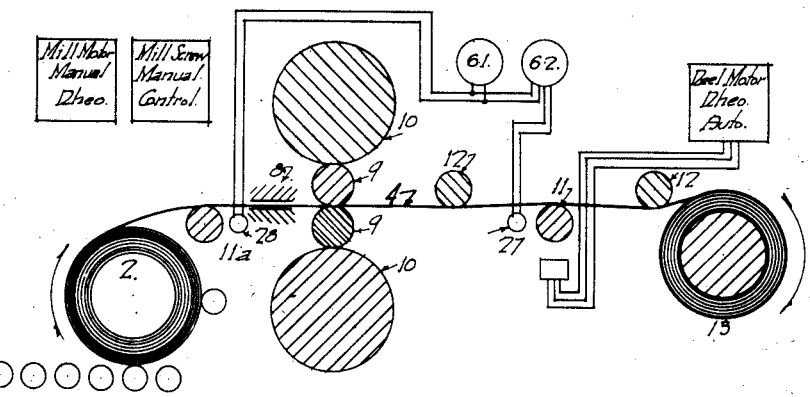
Fig. 7 shows the application of this invention to a single stand 4-high with power driven work rolls and one power driven tight coiler or reel.

Figs. 6 and 7 show the application of my invention to the single mill installation and will not be described as the previous descriptions of parts apply, like parts having like numbers. It will be understood that the installations of Fig. 6 may be run alternately forwards and backwards to give the piece a plurality of passes.

The diagram in Fig. 3 shows the reduction of a strip curve "D" from .0785" to .0247" in the three roughing mill passes, and on the skin pass in No. 4 mill, the reductions "E" being 30%—30%—30% and 8.1%. Mill and puller surface speeds "F" are indicated. The distribution of the tension "G" from the pulling machine 13 between each mill, is indicated with increasing drop at each mill from No. 4 mill to No. 1 mill, so that the power from puller 13 will aid on the heavier reductions. The unit stress in the strip is indicated by the curve "H", which decreases from the puller 13 to No. 1 mill as indicated. The curve "J" shows the puller horsepower (H. P.) absorbed by the various mills and the brake 8. The mills using about 98% of the H. P. to assist in the rolling operation, and about 2% of the horsepower is dissipated by brake 8.

It will be seen from the foregoing description that the individual speed regulation is dependent upon the tension in the strip preceding each particular mill, also that the tension is of a predetermined value, and the speed regulation is based entirely upon this value. Such a device is only applicable to mills with driven rolls. The predetermined tension that exists between the various mills is effective on each mill in the train to the extent of the total tension from the pulling machine 13, and is proportioned among the various mills. The tension produced by the pulling machine can be effective on the mills beyond the mills next to the pulling machine 13. The horsepower output of the pulling machine 13 (F. P. M. times pull in lbs.) can be effectively distributed to facilitate the rolling operation. No mill in the train can act as a tension machine, and the tension on each mill is in the direction of the rolling.

Without further description it is thought the features and advantages of my invention will be readily apparent to those skilled in the art, and it will of course be understood that changes in the form, proportion and minor details of construction may be resorted to without departing from the spirit of my invention or the scope of the appended claims.

I claim:

1. In combination with a rolling mill, tensioning means for a work piece passing therethrough, means for measuring the tension of said piece between said mill and said tensioning means, automatic means connected therewith for regulating the speed of said tensioning means, means for measuring the effective surface speeds of a work piece as it enters and as it leaves said mill, and means for automatically actuating the screw down of said mill in accordance with the differential value of said measurements.

2. In combination with a tandem train of rolling mills, means for measuring the effective surface speeds of the piece as it enters and as it leaves a plurality of mills in said train respectively, motorized screw downs on said respective mills, and automatic means connected with said measuring means to actuate said screw downs in accordance with the differentials of said measurements respectively.

3. In combination with a tandem train, rolling mills, means for automatically maintaining a pass reduction equilibrium between mills in accordance with predetermined ratios, said means comprising means for measuring the surface speeds of a work piece between mills, and means for effecting said control in accordance with the differential of said measurements as between mills.

4. In combination with a mill train having driven rolls, a pulling machine with driven rolls and mill speed regulating means, an indicating means showing the elongation of strip when rolled on each mill, and means for controlling the mill screw downs automatically in accordance therewith.

5. In combination with a rolling mill, means rotating at the peripheral speeds of the work piece as it enters and as it leaves said mill, tachometer generators connected with said means, an indicating device, opposed windings on said indicating device connected with said generators, contact devices associated with said indicating means, means for setting said contact devices in accordance with a predetermined desired elongation, a motorized screw down for said mill, and forward and reverse connections for said motorized screw down operatively associated with said contacts.

6. In combination with a mill and a tensioning device, a device for measuring tension therebetween of material being rolled, said device having means for controlling the speed of said tensioning device, and means for rendering said speed controlling means inactive when said tension falls below a predetermined value.

7. In a tension measuring device for use on material being rolled, and having means for regulating the speed of tension producing or distributing mechanism, means for rendering said speed regulating means inactive when said tension falls below a predetermined value.

8. The combination with a rolling mill, of a speed ratio indicating system therefor comprising a generator driven by the stock entering the mill, a generator driven by the stock leaving the mill, for generating voltages proportional to the entering and delivery speeds of the stock, an electric means connected to the generators so as to be responsive to the difference of voltages delivered thereby, and a screw-down motor mechanism for the rolling mill controlled by said electric means for maintaining the ratio of said speeds substantially constant.

9. In combination with a rolling mill, separate stock-responsive means disposed on opposite sides of the mill to operate at speeds corresponding with the speeds of the stock at such points, and means calibrated in terms of the percentage of reduction being taken by the mill arranged to compare the operations of the stock-responsive means on the discharge side of the mill with that one on the entrance side.

10. In combination with a rolling mill having a motorized screw down, means for measuring the effective surface speeds of a work piece as it enters and as it leaves said mill, means for causing said measurements to be subtractively effective to position a member stationarily at given positions representative of all given elongations of a series, whereby when the elongation changes to a new value said member is acted upon by a force urging it to assume a new stationary position representative of said value, contacts associated with said member, and electrical means associated with said contacts to energize the screw down motor in accordance with the movements of said member.

11. In combination with a rolling mill having a motorized screw down, means for measuring the effective surface speeds of a work piece as it enters and as it leaves said mill, means for causing said measurements to be subtractively effective to position a member stationarily at given positions representative of all given elongations of a series, whereby when the elongation changes to a new value said member is acted upon by a force urging it to assume a new stationary position representative of said value, contacts associated with said member, and electrical means associated with said contacts to energize the screw down motor in accordance with the movements of said member and means for setting said contacts at positions representative of desired elongations.

EDWIN B. HUDSON.